M. K. LEWIS.
Corn-Harvesters.
No. 150,661. Patented May 5, 1874.
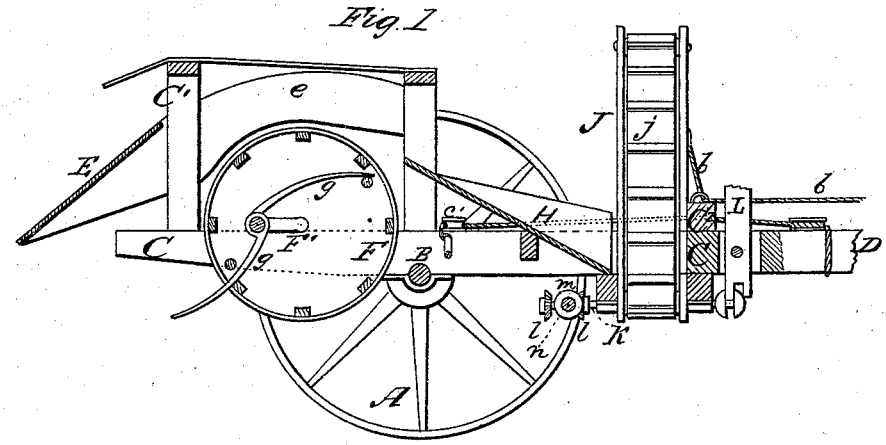
Fig. 1
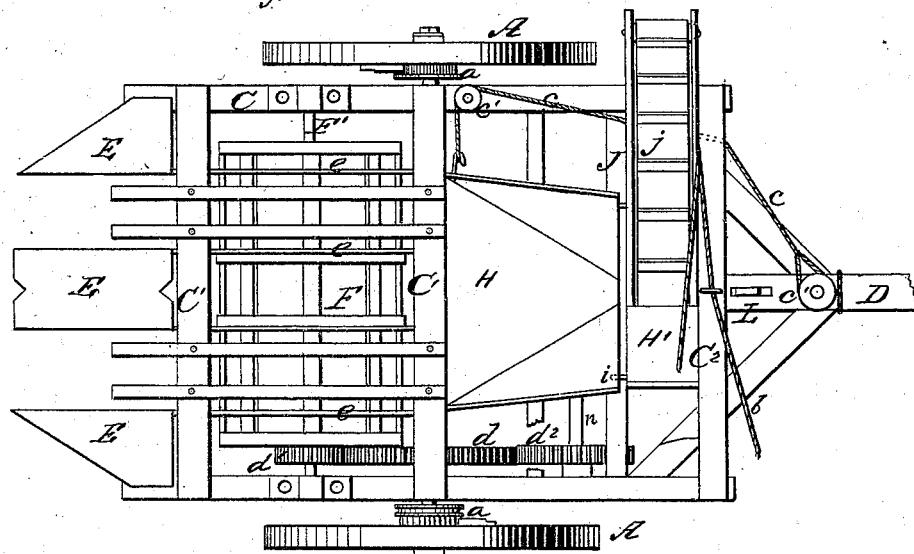
Fig. 2
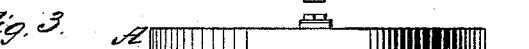
Fig. 3
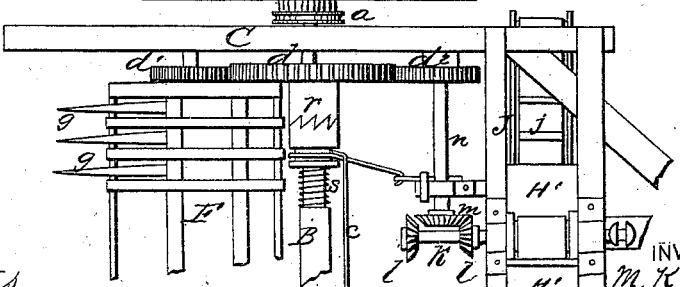
WITNESSES
E. H. Bates
Geo. E. Upham
By
INVENTOR
M. K. Lewis
Chipman Hosmer & Co
ATTORNEYS.

UNITED STATES PATENT OFFICE.

MILES K. LEWIS, OF HASTINGS, NEBRASKA.

IMPROVEMENT IN CORN-HARVESTERS.

Specification forming part of Letters Patent No. 150,661, dated May 5, 1874; application filed March 7, 1874.

*To all whom it may concern:*

Be it known that I, MILES K. LEWIS, of Hastings, in the county of Adams and State of Nebraska, have invented a new and valuable Improvement in Corn-Harvesters; and I do hereby declare that the following is a full, clear, and exact description of the construction and operation of the same, reference being had to the annexed drawings making a part of this specification, and to the letters and figures of reference marked thereon.

Figure 1 of the drawing is a representation of a sectional view, and Figs. 2 and 3 plan views of the same.

This invention has relation to machinery for harvesting corn; and it consists in stripping-fingers, which are applied eccentrically in a revolving drum, so as to strip the corn from the stalks, and deliver the same into a hopper to be conveyed by an elevator into a wagon accompanying the machine; said fingers being so arranged and operated that they are caused to protrude from the drum to gather the corn, and to recede inside of the drum at the points for delivering the corn into the hopper; and also in certain other novel features, which will be hereinafter fully explained.

In the annexed drawings, A A designate the transporting and driving wheels, which are connected to an axle, B, by means of ratchets and pawls $a\ a$, which will cause the axle to turn with its wheels only when the machine is moved forward. C designates a rectangular draft-frame, which is mounted on the axle B, and provided at its rear end with a draft or pushing pole, D, to which the horses are suitably hitched. At the front end of the frame C, and secured to upright portions $C^1$ thereof, are inclined gatherers E, which are properly spaced and designed for gathering the corn into the pickers. The rear ends of these inclined gatherers terminate in partition-guides $e$, which extend back to an inclined hopper or chute, H. F designates a revolving cylindrical drum or cage, which is made up of circular bands and longitudinal bars, arranged at suitable distances apart, and secured to two heads, which are applied to the ends of a fixed cranked axle, F', so as to turn freely around it. On this cranked axle F' are pivoted the strippers $g$, which are parallel blades, tapered to their outer ends, and arranged on the cranked portion of the axle F', so as to turn freely around it. The cranked portion of the axle F' is eccentric to the axis of the drum F, and arranged in front of this axis, but within the drum; consequently, when the drum is revolved, it will cause the strippers $g$ to protrude from it in front, and gather the corn from the stalks, carry it back, and deliver it into the chute or hopper H. As the drum revolves backward the strippers are caused to recede within it, thus clearing themselves of the corn at the proper points for delivering it into the chute H. The drum F receives rotation from the axle B by means of two spur-wheels, $d\ d^1$, the former one of which is connected to said axle by a clutch, $r$, acted on by a spring, $s$. A rope or chain, $c$, is attached to one part of the clutch $r$, and carried forward around pulleys $c'$ to a place which is convenient to the driver, by which means he can stop the rotation of the drum F at his pleasure. The hopper or chute H conducts the corn to the lower end of an elevator-apron, $j$, which is applied around rollers at its upper and lower ends, which rollers are applied in a frame, J. The lower roller of the apron $j$ is keyed on a centrally-arranged longitudinal shaft, K, on which shaft the lower ends of the frame J are pivoted, so that it can be inclined to either side of the main frame C. By means of a rope or chain, $b$, which is attached to two hopper-wings, H', and to the frame J, and passed through an eye, $b'$, on the front cross-beam $C^2$ of frame C, the driver can shift the frame J from one side to the other of this frame. The two wings H' H' are pivoted to opposite sides of the frame J, so that in whatever position the apron-frame may be placed, one of these wings will receive the corn after it leaves the chute H, and support the corn in a position to be elevated by the apron $j$. The shaft K is movable longitudinally by means of a hand-lever, L, applied at the rear end of the frame C, and on the front end of this shaft K two beveled spur-wheels, $l\ l$, are keyed, either one of which can be engaged with a bevel spur-wheel, $m$, on a transverse shaft, $n$. (Shown in Figs. 2 and 3.) The shaft $n$ receives rotation from the spur-wheel $d$ by means of a spur-wheel, $d^2$. It is necessary to reverse the rotation of the shaft K when the apron-frame is adjusted from the right to the left hand side of the frame C, for the purpose of having the apron j rotate in the right direction to elevate the corn. The reverse movements are obtained by adjusting the shaft K so as to engage one or the other of the bevel-wheels l l with the wheel m.

It will be seen from the above description that when the machine is moved forward the stalks of two rows will pass between the gatherers E, when the strippers g will strip off the corn and deliver it into the chute H, to be elevated by the apron j and deposited into a suitable receiver.

Having thus described my invention, what I claim as new, and desire to secure by Letters Patent, is—

1. The combination of the stripping-fingers g, pivoted eccentrically to a shaft, F', inside of a revolving drum or cage, F, stalk-gatherers E, and a chute or receiver, H, substantially as and for the purpose described.

2. The pivoted wings H' H', combined with the laterally-reversible elevator-frame J, substantially as described.

In testimony that I claim the above I have hereunto subscribed my name in the presence of two witnesses.

MILES K. LEWIS.

Witnesses:
LYMAN P. LEWIS,
B. M. TALBOTT.